(12) United States Patent
Lee

(10) Patent No.: US 8,775,338 B2
(45) Date of Patent: Jul. 8, 2014

(54) COMPUTER-IMPLEMENTED SYSTEMS AND METHODS FOR CONSTRUCTING A REDUCED INPUT SPACE UTILIZING THE REJECTED VARIABLE SPACE

(75) Inventor: Taiyeong Lee, Cary, NC (US)

(73) Assignee: SAS Institute Inc., Cary, NC (US)

( * ) Notice: Subject to any disclaimer, the term of this patent is extended or adjusted under 35 U.S.C. 154(b) by 488 days.

(21) Appl. No.: 12/647,064

(22) Filed: Dec. 24, 2009

(65) Prior Publication Data

US 2011/0161263 A1    Jun. 30, 2011

(51) Int. Cl.
  *G06N 3/12*    (2006.01)
(52) U.S. Cl.
  USPC ............................................................ 706/13
(58) Field of Classification Search
  None
  See application file for complete search history.

(56) References Cited

U.S. PATENT DOCUMENTS

| | | | |
|---|---|---|---|
| 7,480,640 B1* | 1/2009 | Elad et al. ....................... | 706/14 |
| 7,653,491 B2* | 1/2010 | Schadt et al. ................... | 702/20 |
| 2005/0234688 A1 | 10/2005 | Pinto et al. | |
| 2005/0234698 A1 | 10/2005 | Pinto et al. | |
| 2005/0234763 A1 | 10/2005 | Pinto et al. | |
| 2006/0161403 A1 | 7/2006 | Jiang et al. | |
| 2008/0133434 A1* | 6/2008 | Asar et al. ....................... | 706/12 |
| 2008/0154814 A1* | 6/2008 | Chaudhury et al. ............. | 706/14 |
| 2009/0018982 A1 | 1/2009 | Morrison | |
| 2011/0129826 A1* | 6/2011 | Tanaka et al. ................ | 435/6.11 |

OTHER PUBLICATIONS

Conover and Iman, "Rank Transformations as a Bridge Between Parametric and Nonparametric Statistics", The American Statistician, vol. 35, No. 3, 1981, pp. 124-129.*
Robertson, Peter, Villet, Ripley, "Comparing models for Predicting Species' Potential Districutions: a case study using correlative and mechanistic predictive modelling techniques", Ecological Modelling, vol. 164, Issue: 2-3, 2003, pp. 153-167.*
Loh, "Improving the Precision of Classification Trees", Annals of Applied Statistics, vol. 3, No. 4, 2009, pp. 1710-1737.*
Blum, "Random Projection, Margins, Kernels, and Feature-Selection", Craig Saunders, Marko Grobelnik, Steve R. Gunn, John Shawe-Taylor (Eds.): Subspace, Latent Structure and Feature Selection, Statistical and Optimization, Perspectives Workshop, SLSFS 2005, Bohinj, Slovenia, Feb. 23-25, 2005, pp. 52-68.*
Feelders, "Credit Scoring and Reject Inference with Mixture Models", International Journal of Intelligent Systems in Accounting, Finance & Mangement,, John Wiley & Son, Ltd., vol. 9, 2000, pp. 1-8.*

(Continued)

*Primary Examiner* — Kakali Chaki
*Assistant Examiner* — Walter Hanchak
(74) *Attorney, Agent, or Firm* — Kilpatrick Townsend & Stockton LLP

(57) ABSTRACT

Computer-implemented systems and methods are provided for generating a data model. A variable predictiveness determination is performed on the population of candidate variables. A plurality of variables from the population of candidate variables are selected as a selected set based on the variable predictiveness values. A plurality derived variables are generated based on variables in the rejected set without consideration of any variables in the selected set. One or more derived variables are selected as based on derived variable predictiveness values of the derived variables, and the selected set and the one or more selected derived variables are stored as the model input variables for the data model.

39 Claims, 14 Drawing Sheets

(56) References Cited

OTHER PUBLICATIONS

Ium, "Random Projection, Margins, Kernels, and Feature-Selection", Craig Saunders, Marko Grobelnik, Steve R. Gunn, John Shawe-Taylor (Eds.): Subspace, Latent Structure and Feature Selection, Statistical and Optimization, Perspectives Workshop, SLSFS 2005, Bohinj, Slovenia, Feb. 23-25, 2005, pp. 52-68.*

Grabczewski, Jankowski, "Complex models for classification of high-dimensional data—exploration with GhostMiner", unpublished NIPS 2004 submission found at "http://www.fizyka.umk.pl/publications/kmk/NIPS/GMNIPS.pdf" and referenced in Asar et al. (US 2008/0133434 A1).*

Zhang, Orgun, Zhang, "A Prediction-Based Visual Approach for Cluster Exploration and Cluster Validation by HOV", Knowledge Discovery in Databases: PKDD 2007 in Lecture Notes in Computer Science vol. 4702, 2007, pp. 336-349.*

Shyu, Chen, Sarinnapakorn, Chang, "A Novel Anomaly Dectection Scheme Based on Principal Component Classifier", In: Proc. of the IEEE Foundations and New Directions of Data Mining Workshop, republished: Foundations and Novel Approaches in Data Mining Studies in Computational Intelligence vol. 9, 2006, pp. 311-329.*

Achlioptas, Dimitris, "Database-friendly random projections: Johnson-Lindenstrauss with binary coins", Journal of Computer and System Sciences, vol. 66, pp. 671-687 [2003].

Dasgupta, Sanjoy et al., "An elementary proof of the Johnson-Lindenstrauss Lemma", International Computer Science Institute, pp. 1-5.

Gorman, R. Paul et al., "Analysis of Hidden Units in a Layered Network Trained to Classify Sonar Targets", Neural Networks, vol. 1, pp. 75-89 [1988].

Johnson, William B. et al., "Extensions of Lipschitz Mappings Into a Hilbert Space", Contemporary Mathematics, vol. 26, pp. 189-206 [1984].

Lee, Taiyeong et al., "Predictive Models Based on Reduced Input Space That Uses Rejected Variables", Paper 111-2009, SAS Global Forum 2009 Data Mining and Predictive Modeling, pp. 1-15.

Wolf, Lior et al., "Combining Variable Selection with Dimensionality Reduction", The Center for Biological and Computational Learning, 6 pp.

* cited by examiner

700

| Variable Selection | | | |
|---|---|---|---|
| Name | Role | Level | Comment △ |
| amount | Input | Interval | |
| checking | Input | Interval | |
| duration | Input | Interval | |
| foreign | Input | Interval | |
| history | Input | Interval | |
| installp | Input | Interval | |
| other | Input | Interval | |
| purpose | Input | Nominal | |
| savings | Input | Interval | |
| age | Rejected | Interval | Varsel:Small R-square value |
| coapp | Rejected | Interval | Varsel:Small R-square value |
| depends | Rejected | Interval | Varsel:Small R-square value |
| employed | Rejected | Interval | Varsel:Small R-square value |
| existcr | Rejected | Interval | Varsel:Small R-square value |
| housing | Rejected | Interval | Varsel:Small R-square value |
| job | Rejected | Interval | Varsel:Small R-square value |
| marital | Rejected | Interval | Varsel:Small R-square value |
| property | Rejected | Interval | Varsel:Small R-square value |
| resident | Rejected | Interval | Varsel:Small R-square value |
| telephon | Rejected | Interval | Varsel:Small R-square value |

Fig. 7

| Random Projection Matrix | | | | | | | | | |
|---|---|---|---|---|---|---|---|---|---|
| RPV1 | RPV2 | RPV3 | RPV4 | RPV5 | RPV6 | RPV7 | RPV8 | RPV9 | RPV10 |
| 0.767525 | 2.260774 | -1.15644 | -0.9506 | 0.160656 | 1.034888 | 0.033369 | -0.6049 | 1.743889 | -0.0428 |
| 0.990042 | 1.553993 | 0.689938 | 0.013239 | -0.24471 | 0.968651 | -2.0181 | 0.131461 | -1.72067 | 0.80352 |
| -0.67497 | -0.90165 | -1.28474 | 1.1013 | 0.756555 | 0.62684 | -0.95448 | 0.73901 | -0.17677 | -0.98214 |
| -0.16728 | -0.49903 | 0.40206 | -0.37098 | 0.218778 | 0.927773 | -1.13131 | -0.52473 | -1.78842 | -0.35035 |
| 0.502873 | 0.270932 | -0.67262 | 0.82874 | -0.10456 | -1.10004 | -0.40925 | -0.25785 | 1.453048 | 0.504369 |
| 0.344871 | 0.673854 | -0.91845 | 0.292544 | -1.0031 | -0.32774 | 0.028488 | 1.04108 | 0.46437 | -1.01833 |
| 3.421082 | 1.471187 | -0.31609 | 0.10717 | 0.231557 | 0.474024 | 0.461838 | 0.511607 | 0.589859 | 0.534024 |
| -0.70568 | 0.787496 | 1.005162 | 1.579922 | 0.841892 | 2.385951 | 1.515943 | 0.076723 | -2.79266 | 1.379481 |
| -0.15074 | -0.95802 | -0.43457 | 0.765283 | -0.24951 | 0.105303 | -0.487 | -1.02776 | 0.746796 | 0.539848 |
| -0.08141 | 1.099105 | 0.466938 | 0.212444 | -0.55704 | 0.189592 | 1.886047 | -0.43662 | -0.49222 | -1.21716 |
| 1.55748 | -0.8334 | 0.666113 | -0.70426 | 1.17424 | -1.04949 | -1.08363 | 0.153772 | 0.515281 | 0.656777 |

| Variables-Reg | | | | | |
|---|---|---|---|---|---|
| Name | Label | Role | Use | Report | Level |
| foreign | | Input | Default | No | Interval |
| _RP10_ | Random Projection Vector 10 | Input | Default | No | Interval |
| savings | | Input | Default | No | Interval |
| history | | Input | Default | No | Interval |
| purpose | | Input | Default | No | Nominal |
| amount | | Input | Default | Yes | Interval |
| installp | | Input | Default | No | Interval |
| checking | | Input | Default | No | Interval |
| other | | Input | Default | No | Interval |
| _RP6_ | Random Projection Vector 6 | Input | Default | No | Interval |

Fig. 11

1100 

```
                Fit Statistics
       Model selection based on _VMISC_
                                   Valid:
  Selected    Model   Model    Misclassification
   Model      Node                   Rate Y        Reg1                   0.215
              Reg2                   0.215
```

COMPUTER-IMPLEMENTED SYSTEMS AND METHODS FOR CONSTRUCTING A REDUCED INPUT SPACE UTILIZING THE REJECTED VARIABLE SPACE

FIELD

The technology described herein relates generally to data modeling and more specifically to selection of variables for use in data modeling.

BACKGROUND

A statistical model is a set of mathematical equations which describe the behavior of an object of study in terms of random variables and their associated probability distributions. For example, in order to forecast and manage business risk, a set of variables is identified that describe the state of the world and are forecasted into the future. To help with these processes, data mining may be used to track large numbers of candidate variables (e.g., hundred, thousands, or more). In selecting which variables from the candidate set should be used in generating a data model, a balance is sought between selecting a small enough number of variables so that the model is interpretable to a user and avoiding the loss of significant amounts of information in the data contained in rejected variables.

SUMMARY

In accordance with the teachings herein, computer-implemented systems and methods are provided for generating a data model for analysis of data representative of a physical process over a period of time, the data model being based on a set of model input variables selected from and generated from a population of candidate variables. A variable predictiveness determination may be performed on the population of candidate variables using a processor, where the variable predictiveness determination assigns a variable predictiveness value to each variable in the population of candidate variables. A plurality of variables from the population of candidate variables may be selected as a selected set based on the variable predictiveness values of the variables in the population of candidate variables, where variables not in the selected set are members of a rejected set. A plurality of derived variables may be generated based on variables in the rejected set without consideration of any variables in the selected set, and a derived variable predictiveness determination may be performed on the plurality of derived variables using the processor, where the derived variable predictiveness determination assigns a derived variable predictiveness value to each derived variable. One or more derived variables may be selected as selected derived variables based on the derived variable predictiveness values of the derived variables, and the selected set and the one or more selected derived variables may be stored in a computer-readable memory as the model input variables for the data model.

As another example, a computer-implemented system for generating a data model for analysis of data representative of a physical process over a period of time, where the data model is based on a set of model input variables selected from and generated from a population of candidate variables may include a data processor and a computer-readable memory encoded with instructions for causing the data processor to perform steps that may include performing a variable predictiveness determination on the population of candidate variables using a processor, where the variable predictiveness determination assigns a variable predictiveness value to each variable in the population of candidate variables and selecting a plurality of variables from the population of candidate variables as a selected set based on the variable predictiveness values of the variables in the population of candidate variables, where variables not in the selected set are members of a rejected set. A plurality of derived variables may be generated based on variables in the rejected set without consideration of any variables in the selected set, and a derived variable predictiveness determination may be performed on the plurality of derived variables using the processor, where the derived variable predictiveness determination assigns a derived variable predictiveness value to each derived variable. One or more derived variables may be selected as selected derived variables based on the derived variable predictiveness values of the derived variables, and the selected set and the one or more selected derived variables may be stored in a computer-readable memory as the model input variables for the data model.

As a further example, a computer-readable memory is encoded with instructions for performing a method of generating a data model for analysis of data representative of a physical process over a period of time, where the data model is based on a set of model input variables selected from and generated from a population of candidate variables. The method may include performing a variable predictiveness determination on the population of candidate variables using a processor, where the variable predictiveness determination assigns a variable predictiveness value to each variable in the population of candidate variables and selecting a plurality of variables from the population of candidate variables as a selected set based on the variable predictiveness values of the variables in the population of candidate variables, where variables not in the selected set are members of a rejected set. A plurality of derived variables may be generated based on variables in the rejected set without consideration of any variables in the selected set, and a derived variable predictiveness determination may be performed on the plurality of derived variables using the processor, where the derived variable predictiveness determination assigns a derived variable predictiveness value to each derived variable. One or more derived variables may be selected as selected derived variables based on the derived variable predictiveness values of the derived variables, and the selected set and the one or more selected derived variables may be stored in a computer-readable memory as the model input variables for the data model.

BRIEF DESCRIPTION OF THE DRAWINGS

FIG. 7 is a chart depicting candidate input variables and their status after the variable selection step.

FIG. 8 is a chart depicting coefficients for random projection variables based on members of the rejected variable set.

FIG. 10 is a chart depicting originally selected variables and selected derived variables formed using the generated random projection vectors.

FIG. 11 depicts results of the example model comparison between the models generated using regression operations

DETAILED DESCRIPTION

Figure 1:
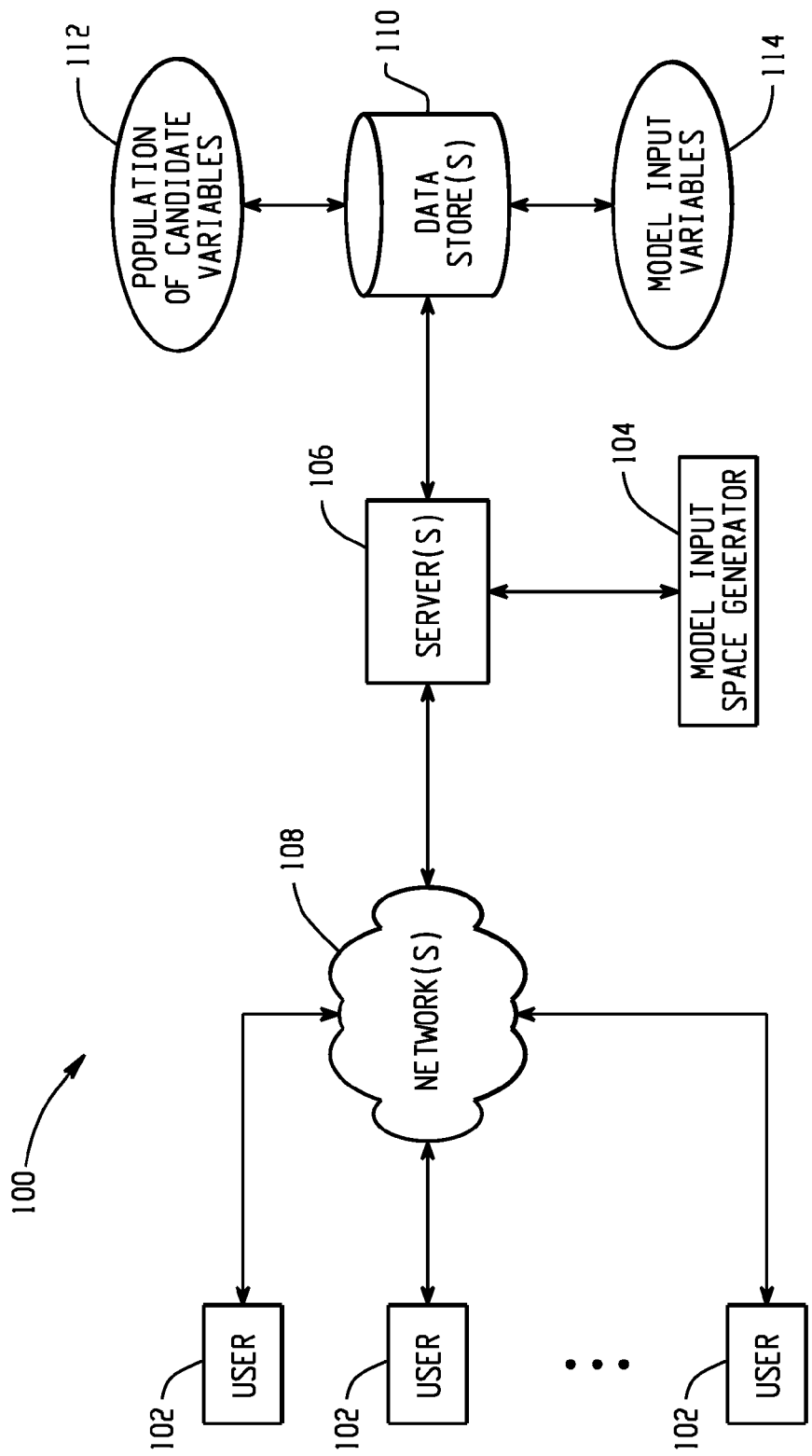
FIG. 1 depicts a computer-implemented environment wherein users can interact with a model input space generator hosted on one or more servers through a network.

FIG. 1 depicts a computer-implemented environment wherein users 102 can interact with a model input space generator 104 hosted on one or more servers 106 through a network 108. The system 104 contains software operations or routines for generating a data model for analysis of data representative of a physical process over a period of time where the data model is based on a set of model input variables selected from and generated from a population of candidate variables 112. The generated data model can be used for many different purposes, such as analysis of physical processes (e.g., manufacturing processes, financial transaction processes, etc.) over a period of time.

The users 102 can interact with the system 104 through a number of ways, such as over one or more networks 108. One or more servers 106 accessible through the network(s) 108 can host the model input space generator 104. It should be understood that the model input space generator 104 could also be provided on a stand-alone computer for access by a user.

A model input space generator 104 may be used in generating data models for analyzing data gathered via data mining. In generating a data model, the model input space generator 104 identifies variables to be utilized in the data model. For data modeling projects that track very large numbers of variables, controlling the number of variables in the input space may improve the ability to perform data mining tasks well.

The model input space generator 104 identifies a model input space using a combination of variable selection to select a set of variables from a candidate set of variables to use in a data model and dimension reduction on the set of rejected variables that are not selected via variable selection. In variable selection, a stepwise regression, correlation, chi-square test, as well as other operations may be used to select certain variables and to reject others. A dimension reduction method is then used on the rejected variables (the rejected variable space) such as principal components analysis, singular value decomposition, random projection, or others to generate one or more derived variables to be used in the data model. Such a method can allow for interpretability of the model based on the individually selected variables with the retained information provided by the one or more generated derived variables.

For example, in one scenario, 1,000 variables are contained in a set of candidate variables for constructing a prediction model. A variable selection method chooses 100 variables among the 1,000 variables and rejects the other 900 variables. However, there may be information relevant to the data model that is contained in the other 900 variables. A projection method, such as a principal component analysis, can generate one or more derived variables based on some or all of the variables in the rejected set in order to further incorporate information present in these variables into the generated data model. The quality of the generated derived variables is evaluated by the model input space generator, and a best one or more of the generated derived variables are included in the data model.

With reference to FIG. 1, the model input space generator 104 generates a data model for analysis of data based on a set of model input variables selected from and generated from a population of candidate variables. The one or more servers 106 are responsive to one or more data stores 110 for providing input data to the model input space generator 104. Among the data contained on the one or more data stores 110 may be a population of candidate variables 112 used in generating data models as well as the model input variables 114 selected and generated for use in the data models.

Figure 2:
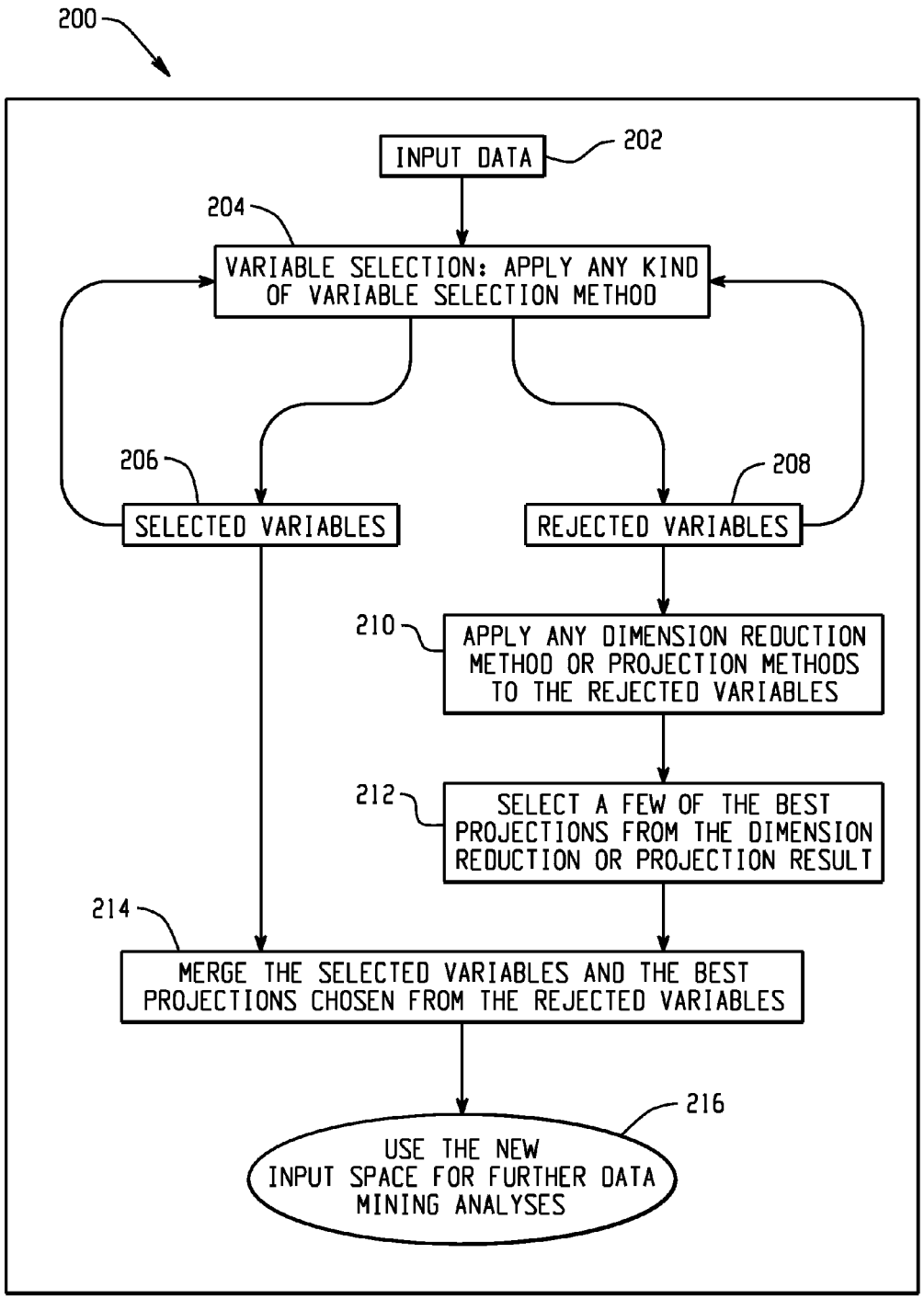
FIG. 2 is a flow diagram depicting processing of a model input space generator.

FIG. 2 is a flow diagram depicting processing of a model input space generator. Input data in the form of data related to a set of candidate variables is received at 202, and a variable selection process is applied at 204. As noted at 204, any kind of variable selection method may be applied to the candidate variables to select variables that are predictive. For example, a chi-square test may be performed to assign a variable predictiveness value to each variable in the population of candidate variables. A number of variables having highest variable predictiveness values or variables having variable predictiveness values above a threshold may be chosen as members of the selected variables set 206. The variables from the set of candidate variables that are not selected become the rejected variables set 208. A type of dimension reduction or projection method is then applied to the rejected variables to generate one or more derived variables at 210. One or more of the best projections from the dimension reduction or projection method performed at 210 are selected for inclusion in the data model at 212. For example, a regression analysis may be performed to assign a derived variable predictiveness value to each of the derived variables. A number of derived variables having highest derived variable predictiveness values or derived variables having derived variable predictiveness values above a threshold may be chosen for inclusion in the model input space. The selected variables set 206 and the chosen derived variables are merged at 214 to create the model input space, which is then utilized in a data model for further data mining analysis 216.

Figure 3:
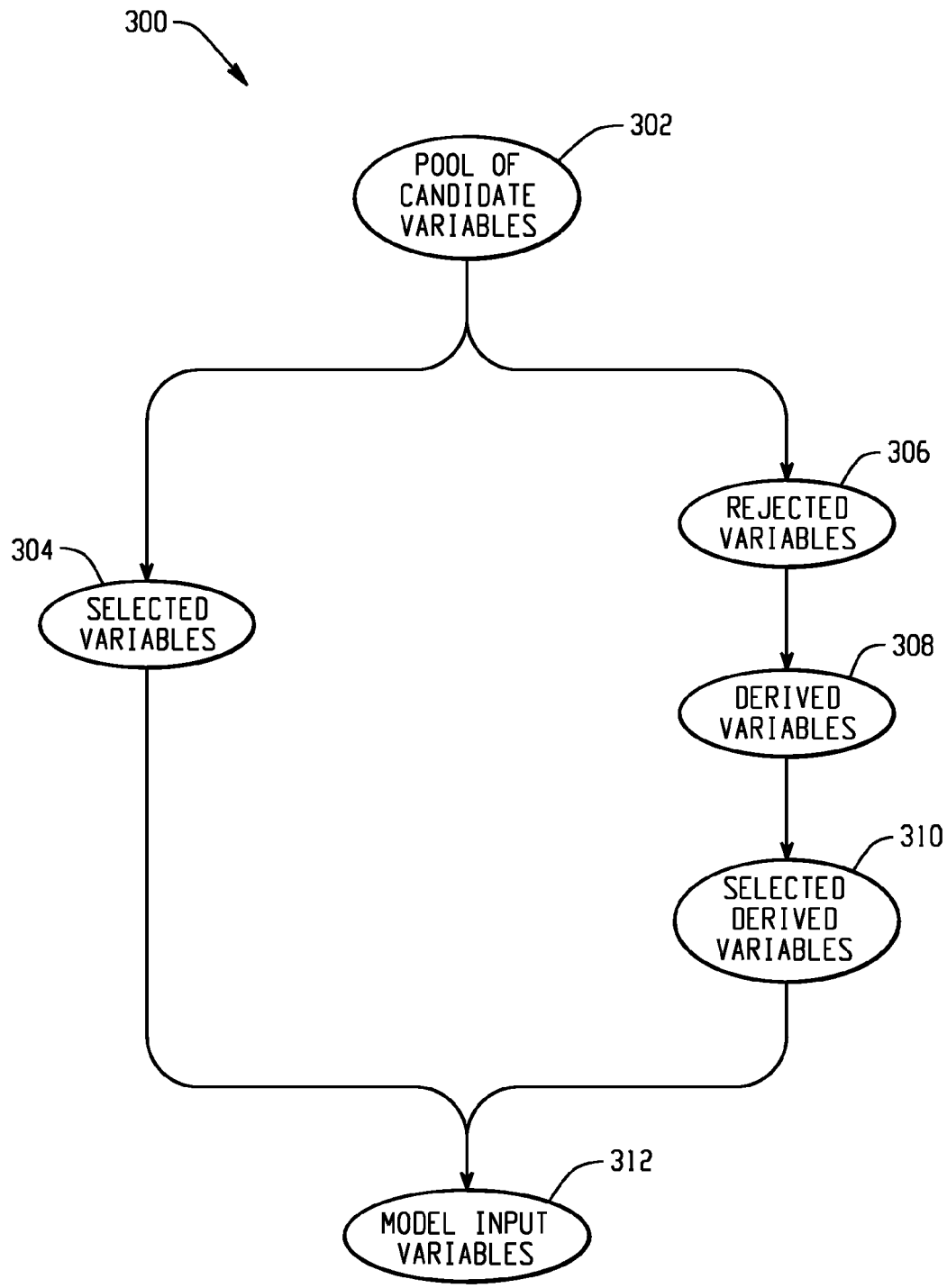
FIG. 3 is a flow diagram depicting the division of the candidate variable set in generating a set of model inputs.

FIG. 3 is a flow diagram depicting the division of the candidate variable set in generating a set of model inputs. The pool of candidate variables 302 is divided by a model input space generator into a set of selected variables 304 and a set of rejected variables 306, such as via an assignment and evaluation of a variable predictiveness value for each variable in the pool of candidate variables 302. A plurality of derived variables 308 are then generated based on the variables within the set of rejected variables 306 without consideration of any variables within the selected variables set 304. For example, several derived variables 308 may be generated using a random projection technique on the rejected variables set 306. One or more of the derived variables (up to all of the generated derived variables) are then chosen as selected derived variables 310, such as via an assignment and evaluation of a derived variable predictiveness value for each of the derived variables 308 (e.g., derived variables having an R-square value >0.9 may be selected). The selected variables 304 are combined with the selected derived variables 310 to generate a set of model input variables 312 to be used in a data model.

Figure 4:
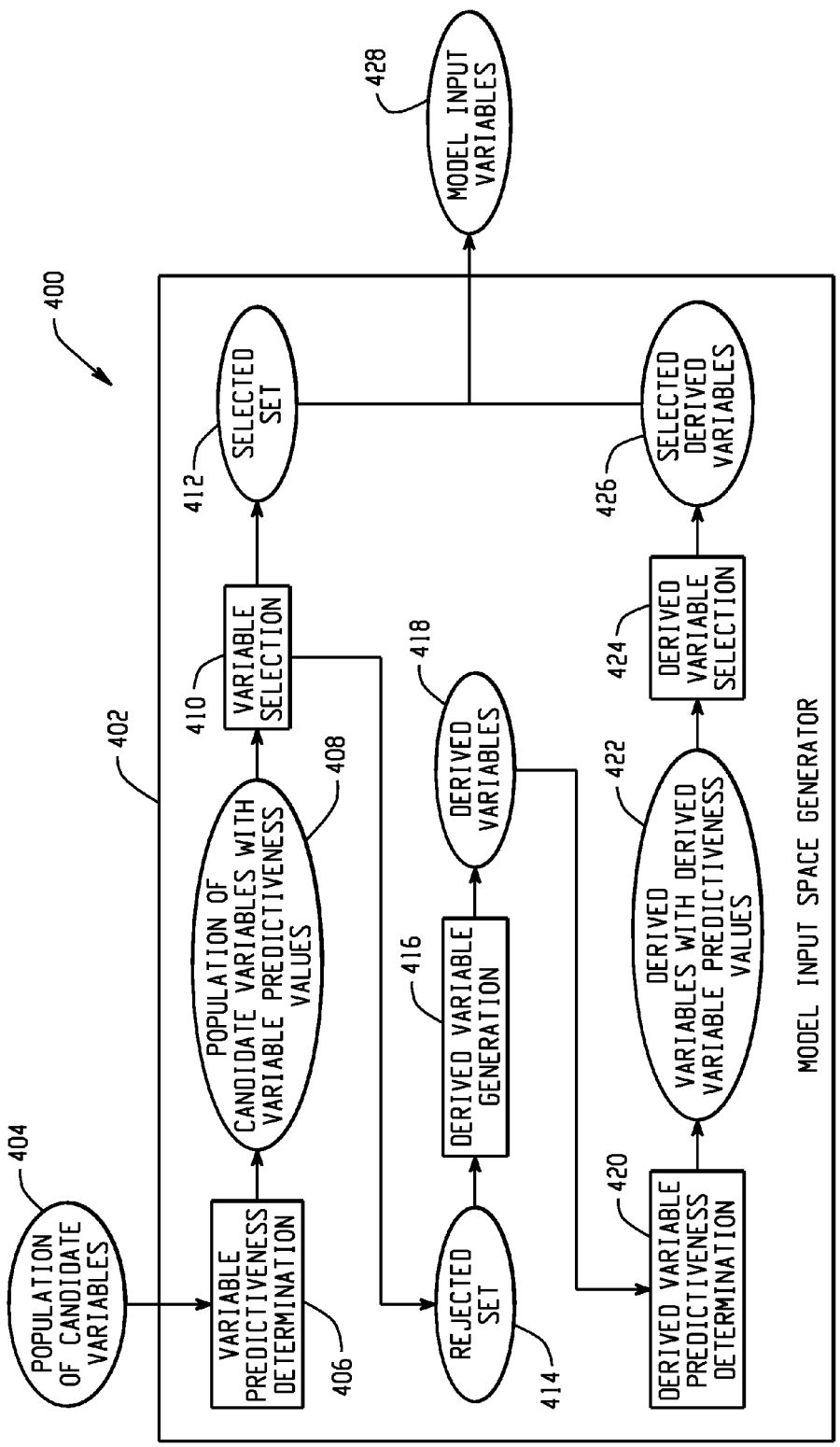
FIG. 4 is a block diagram depicting a data flow through a model input space generator.

FIG. 4 is a block diagram depicting a data flow through a model input space generator. A model input space generator 402 receives a population of candidate variables 404. The model input space generator 402 performs a variable predictiveness determination at 406 to form a population of candidate variables where each variable has a corresponding variable predictiveness value. For example, an R-square criterion may be applied with respect to a target variable at interest through a forward stepwise logistic regression to assign a variable predictiveness value to each variable in the population of candidate variables. A variable selection is then made at 410 to form a selected set 412 and a rejected set 414. For example, a top portion of the candidate variables having desirable variable predictiveness values (e.g., candidate variables having variable predictiveness values in the top 20% of the variable predictiveness values of all of the candidate variables) may be selected as the selected set 412, while the remaining candidate variables are identified as the rejected set 414. In another example, any candidate variables having a variable predictiveness value at or above a threshold value may be selected as the selected set 412, while the remaining candidate variables are identified as the rejected set 414.

A derived variable generation is performed at 416 to generate one or more derived variables based on variables in the rejected set without consideration of any variables in the selected set. For example, a plurality of variables may be generated based on some or all of the variables in the rejected set via random projection, where a random number coefficient is applied to each of the variables, and the sum of each variable multiplied by its random number coefficient is a generated derived variable. Derived variables may be generated using other techniques as well, such as a principal components analysis, singular value decomposition, or other techniques. A derived variable predictiveness determination is performed at 420 to generate a set of derived variables with derived variable predictiveness values 422, and one or more of the derived variables are selected at 424 as the selected derived variables set 426. For example, a binary split model may be applied to the derived variables using a chi-square test to select the best projections from the candidate derived variables 418. The selected set 412 and the selected derived variables 426 may be combined to form the model input variables 428 that make up the model input space.

Figure 5:
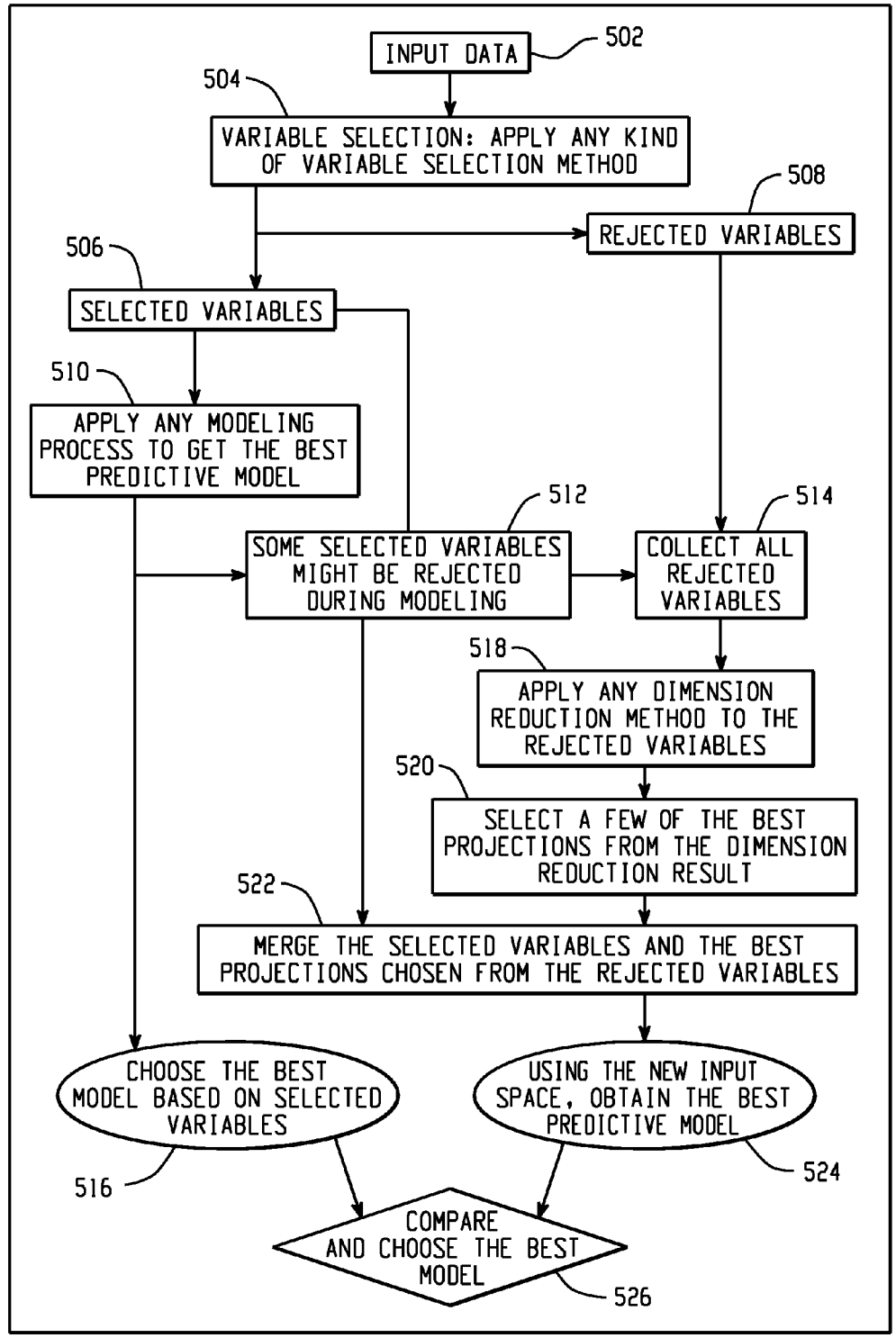
FIG. 5 is a flow diagram depicting a process for developing a data model.

FIG. 5 is a flow diagram depicting a process for developing a data model. Input data is received at 502, and a variable selection method is applied at 504. Based on the variable selection method, a set of selected variables is identified at 506. Variables from the candidate pool of variables that are not members of the selected variables 506 make up a set of rejected variables 508. Based on the set of selected variables 506, a modeling process is applied at 510 to generate a best predictive model. During the process of generating the best predictive model, some selected variables may be rejected at 512 and become members of the rejected variables set 514. For example, variables may be selected as members of the selected variable set 506 based on a first variable predictiveness value applied to the variables, and a portion of those selected variables 506 may be incorporated into the best predictive model at 510 based on a second variable predictiveness value applied to the selected variables 506 (e.g., certain of the selected variables may be deemed not significant). The best predictive model is generated and stored in a computer-readable memory, as shown at 516.

A dimension reduction method is applied to the set of all rejected variables 514 at 518. One or more of the best projections from the dimension reduction step 518 are selected at 520, and these selected derived variables are merged with the set of selected variables 506 at 522. The merged set of variables creates a new input space that is used to generate a data model at 524. The data model containing the derived variables 524 is compared with the stored best model from 516 at 526. This comparison may test the quality of the stored best model from 516 for deciding whether to retain that model 516 or generate a new model, or the better of the models from 516 and 524 may be chosen as a selected model for performing data analysis operations.

Figure 6:
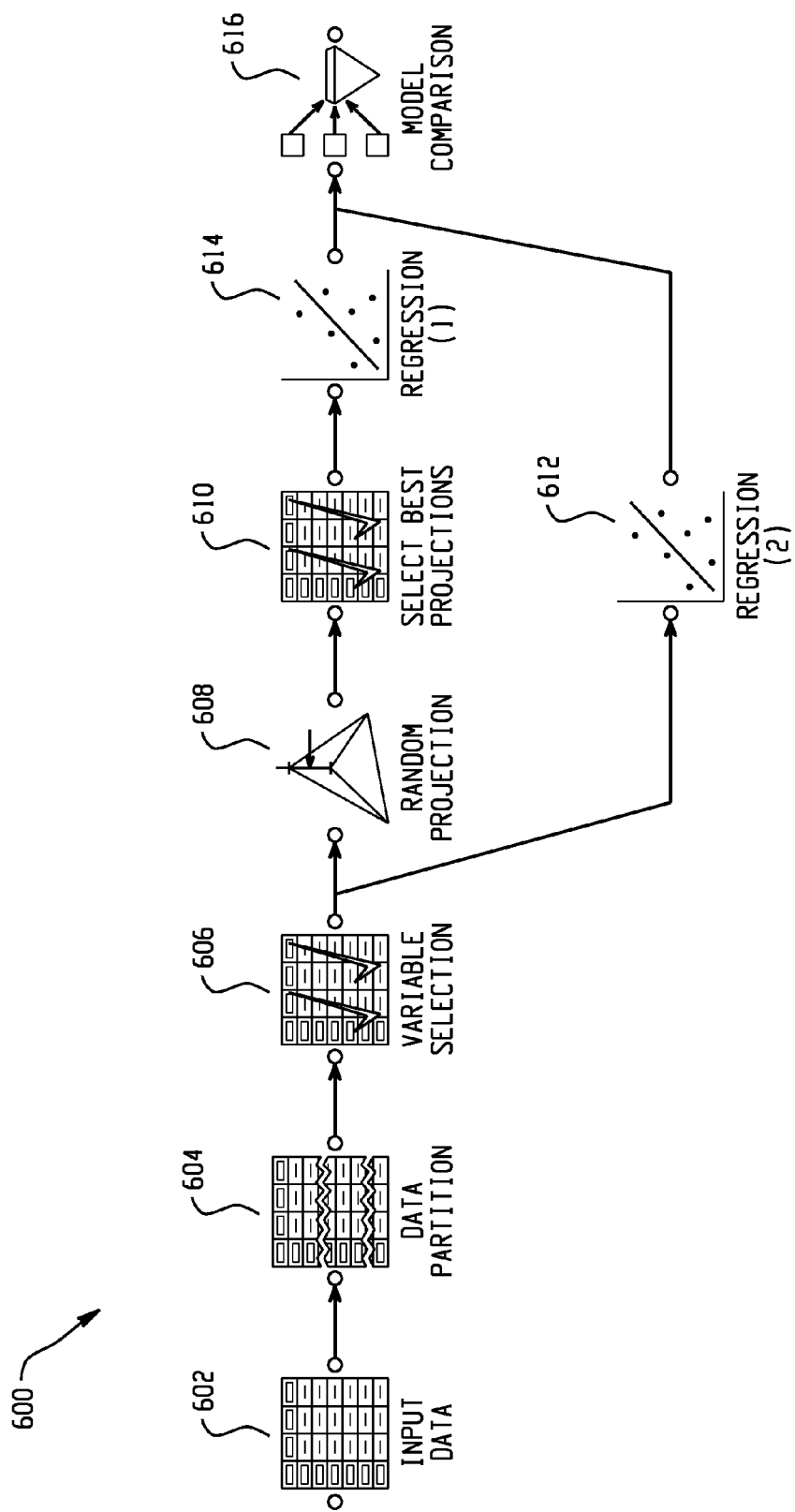
FIG. 6 is a flow diagram depicting a method of generating a data model using a random projection as a dimension reduction technique for testing a disclosed process.

FIG. 6 is a flow diagram depicting a method of generating a data model using a random projection as a dimension reduction technique. Input data is received at 602 and partitioned at 604. In this example, a set of 20 input variables and one target variable, having 1000 observations each, are partitioned for the purpose of model validation, with 60% of the data being used for training and 40% of the data being used for validation. In a variable selection step 606, an R-square criterion is applied through forward stepwise logistic regression. Based on the R-square criterion assigned to each of the 20 candidate input variables, nine input variables are selected as the selected set, while the remaining 11 variables form the rejected set. FIG. 7 is a chart depicting the 20 candidate input variables and their status after the variable selection step 606.

With reference back to FIG. 6, following variable selection at 606, a random projection operation is performed at 608 based on variables in the rejected set without consideration of any variables in the selected set to generate a set of derived variables, and the best derived variables are selected for inclusion in a model input space at 610. FIG. 8 is a chart depicting coefficients for ten random projection variables based on the 11 members of the rejected variable set. Each column lists coefficients corresponding to the 11 rejected variables for random projection variables, the coefficients being labeled RPV1-RPV10. For example, the derived variable _RP6 is calculated from the linear combination of all of the rejected variables using the RPV6 coefficients according to:

_RP6=1.034888067*age+0.9686508181*coapp+
0.6268403247*depends+0.9277725607*employed−1.100042561*existcr−0.32773644*housing+0.4740244195*job+2.3859506457*marital+
0.1053032746*property+
0.1895920912*resident−1.049489085*telephon.

Figure 9:
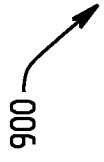
FIG. 9 is a chart identifying the selection of two derived variables from the set of derived variables.

A binary split model is applied to each of the ten random projection variables _RP1-_RP10 using a chi-square test to select the best projections from the candidates. Two projections (_RP6 and _RP10) are selected out of the ten projections. FIG. 9 is a chart identifying the selection of these two derived variables from the set of derived variables. It should be noted that a derived variable generated using a random projection or other technique may be based on some or all of the rejected variables. For example, a derived variable created using a random projection technique may not utilize all variables in the rejected set by providing a coefficient with a value 0 for those variables in the rejected set that are not included in a particular derived variable.

Derived variables may also be selected via an iterative process. For example, a random vector of coefficients may be generated to create a new derived variable. The predictiveness of the new derived variable may be determined, for example, via the assignment of a variable predictiveness value based on a statistical process. For example, if the new variable is determined to be significant, then the new derived variable is kept. Otherwise, the new derived variable is discarded. Another random derived variable may then be generated and evaluated until a goal is reached. For example, the goal may be the selection of a threshold number of significant derived variables, the achievement of a cutoff statistic for model improvement, a number of derived variable generation iterations, or other criteria.

The previously selected variables may then be combined with the new chosen derived variables to create an input space for a data model. For example, FIG. 10 is a chart depicting eight selected variables (one variable, duration, was dropped during the stepwise regression, as described with respect to FIG. 5, based on duration not being a significant predictor) and two selected derived variables formed using the generated random projection vectors. These ten variables may be used as the final input variables for a data mining operation. For example, they may be utilized as independent variables for a regression modeling.

With reference back to FIG. 6, a regression analysis is performed with respect to the eight variables of the selected variable set at 612, and another regression analysis is performed with respect to the eight variables of the selected variable set plus the two selected derived variables at 614. A model comparison is then performed at 616. FIG. 11 depicts results of the example model comparison between the models generated using the regression operations at 612 and 614. Regression 1 uses the new input space that includes the derived variables based on the random projection coefficients shown in FIG. 8 and has two more independent variables than regression 2, which uses only the eight selected variables. Regression 1 and regression 2 have the same settings other than the use of the two selected derived variables. In this example, the predictive model with the new input space increases prediction accuracy by about 1%, as shown in FIG. 11. It should be noted that attempts to recreate this example may offer differing results because the random generation of coefficients for the derived variables (shown in FIG. 8) would generate different random projection coefficients for the derived variables.

Figure 12:
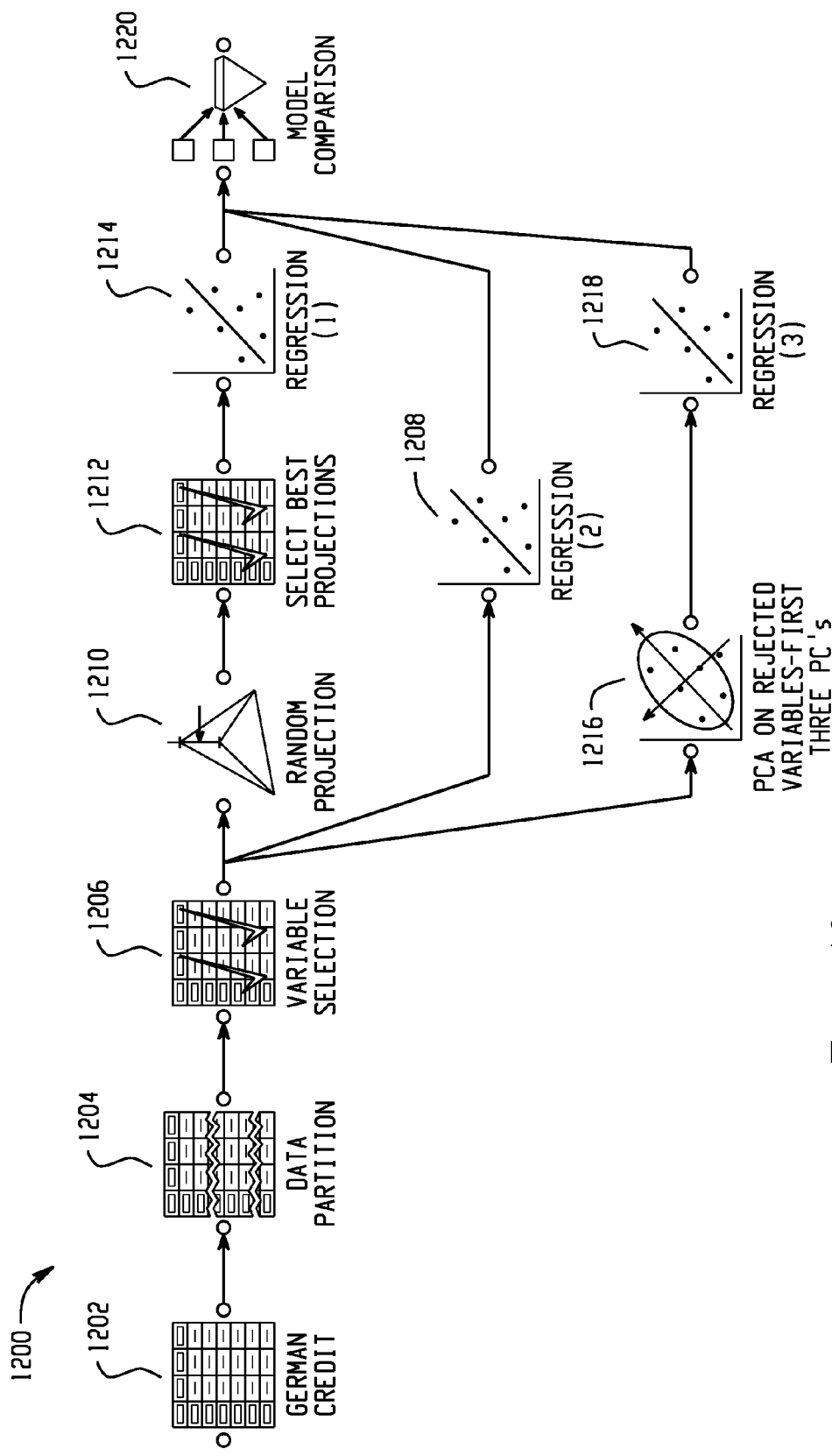
FIG. 12 is a flow diagram illustrating a process for further generating additional derived variables and models in generating a data model.

FIG. 12 is a flow diagram illustrating a process for further generating additional derived variables and models in generating a data model. Similar to the process depicted in FIG. 6, data is collected at 1202 and partitioned at 1204. In a variable selection step 1206, an R-square criterion is applied through forward stepwise logistic regression. Based on the R-square criterion assigned to each of the candidate input variables, a number of input variables are selected as the selected set, while the remaining variables form the rejected set. A regression is performed at 1208 to generate a data model based upon the selected set. A random projection operation is performed at 1210, as described above with respect to FIG. 6, and a number of best projections are selected at 1212. A regression is then performed at 1214 to generate a second data model that utilizes the selected variables and any selected derived variables chosen from the random projection operation at 1212.

At 1216, a principal components analysis is performed using the rejected variables that were not selected at the variables selection at 1206. For example, the first three principal components based on eigenvalues may be chosen as the derived variables. The three principal components are merged with the selected variables to generate a third model input space. In another example, principal components may be selected for the model input space based on their having a largest R-square value between the target variable and a principal component. A regression analysis is performed at 1218 on this third model input space to generate a third data model. Each of the three generated models may be compared at 1220 to determine a best data model for future use in data analysis.

Other configurations may also be used. For example, one or more derived variables may be generated using one dimension reduction technique based on the rejected variable set, and one or more derived variables may be generated using another technique based on the rejected variable set. One or more derived variables from each of the generated sets may be combined with the selected set to create a data model for data analysis.

An analysis may be performed after generation of the derived variables to determine which of the derived variables and members of the selected set should be retained in a data model. For example, the significance of each derived variable generated using dimension reduction techniques and the selected variables may be analyzed as a supplemental variable predictiveness determination. Derived variables and members of the selected set that are deemed significant may be retained in the model input space while insignificant derived variables and selected variables deemed insignificant may be discarded. This process may similarly be performed using only the selected set prior to generation of the derived variables, as described with respect to FIG. 5.

Alternative methods may also be utilized in the variable selection. For example, a variable clustering operation may be performed where the pool of candidate variables is divided into clusters and the most significant one or more variables from each cluster may be selected as the selected set. As other examples, a regression, a decision tree analysis, a correlation operation, a chi-square test, or other operations may be utilized in selecting variables for a selected set.

Figure 13:
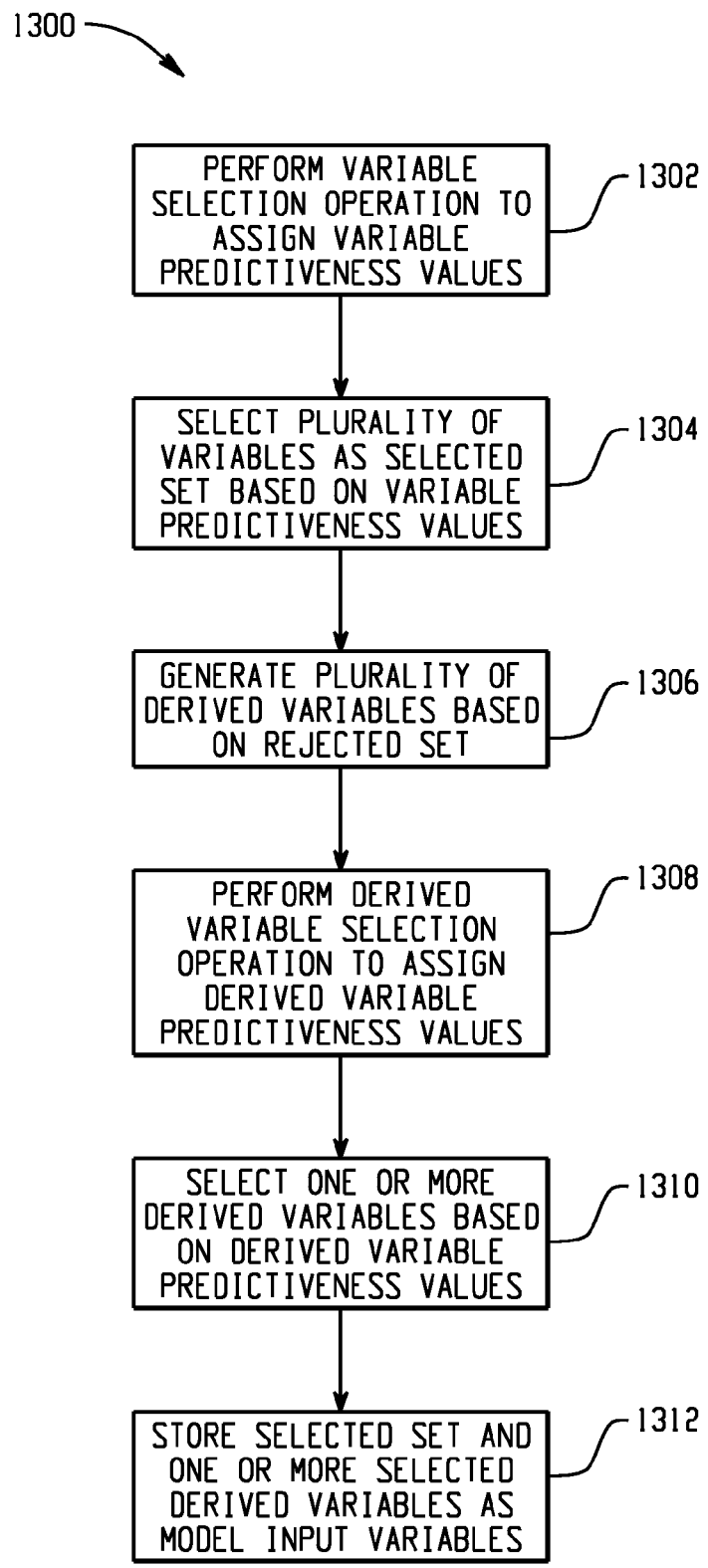
FIG. 13 is a flow diagram depicting a processor-implemented method of generating a data model for analysis of data representative of a physical process over a period of time, the data model being based on a set of model input variables selected from and generated from a population of candidate variables.

FIG. 13 is a flow diagram depicting a processor-implemented method of generating a data model for analysis of data representative of a physical process over a period of time, the data model being based on a set of model input variables selected from and generated from a population of candidate variables. A variable predictiveness determination is made at 1302 on the population of candidate variables using a processor, where the variable predictiveness determination assigns a variable predictiveness value to each variable in the population of candidate variables. At 1304, a plurality of variables are selected from the population of candidate variables as a selected set based on the variable predictiveness values of the variables in the population of candidate variables, where variables not in the selected set are members of a rejected set. One or more derived variables are generated at 1306 based on the variables in the rejected set without consideration of any variables in the selected set. At 1308, a derived variable predictiveness determination is performed on the plurality of derived variables using the processor, where the derived variable predictiveness determination assigns a derived variable predictiveness value to each derived variable. One or more derived variables are selected as selected derived variables based on the derived variable predictiveness values of the derived variables at 1310, and the selected set and the one or more selected derived variables are stored in a computer-readable memory at 1312 as the model input variables for the data model.

Figure 14A:
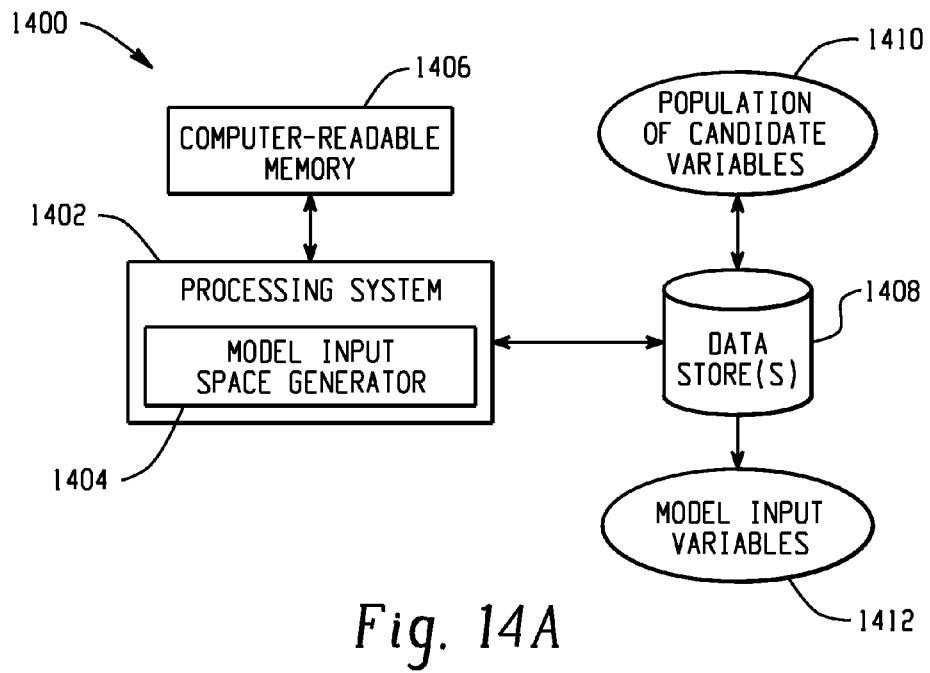
FIGS. 14A, 14B, and 14C depict example processing systems for use in implementing a model input space generator.
Figure 14B:
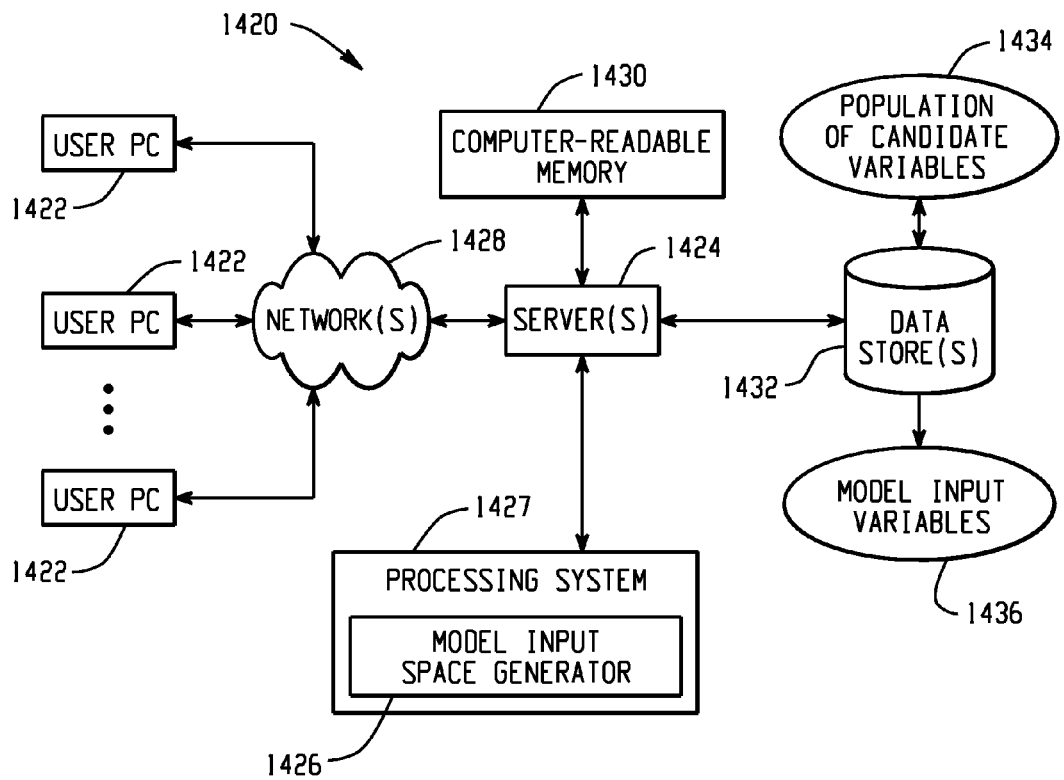
Figure 14C:
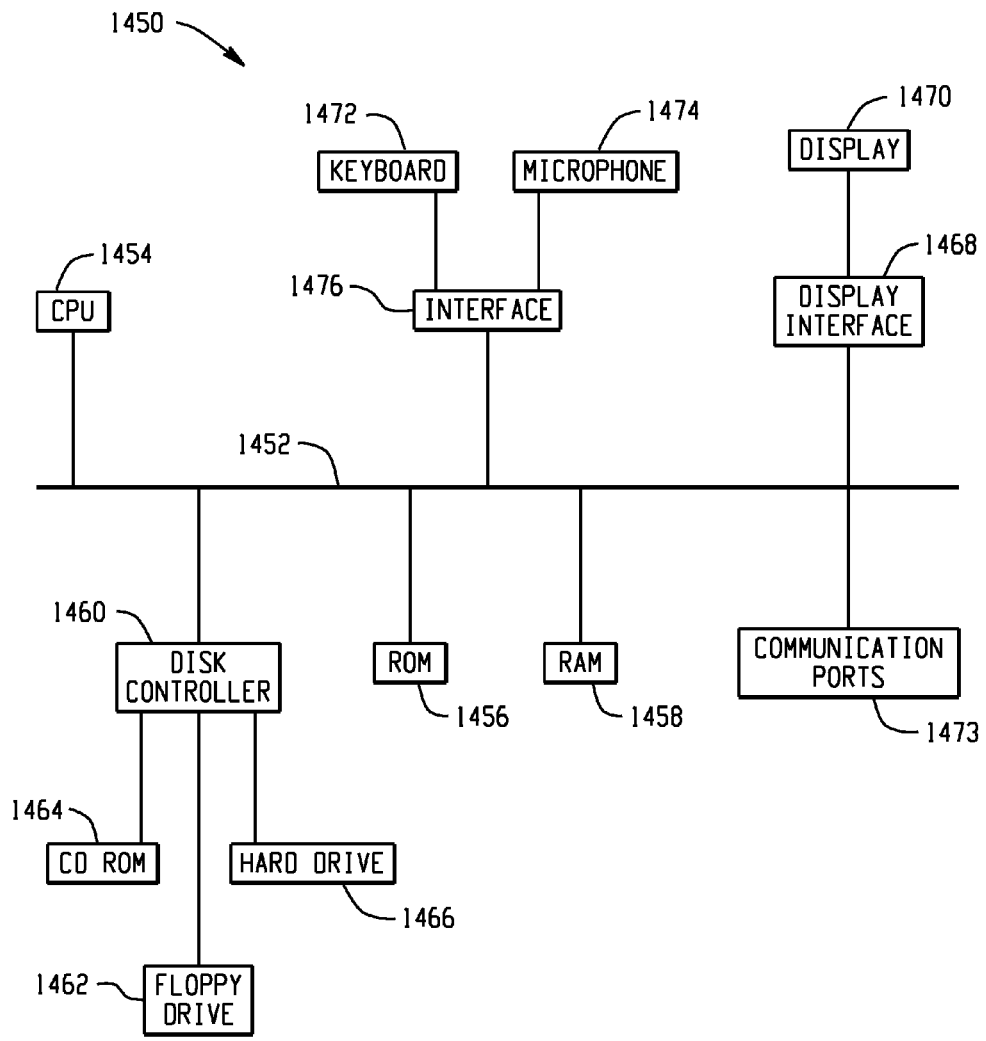

FIGS. 14A, 14B, and 14C depict example systems for use in implementing a model input space generator. For example, FIG. 14A depicts an exemplary system 1400 that includes a stand alone computer architecture where a processing system 1402 (e.g., one or more computer processors) includes a model input space generator 1404 being executed on it. The processing system 1402 has access to a computer-readable memory 1406 in addition to one or more data stores 1408. The one or more data stores 1408 may contain a population of candidate variables 1410 as well as model input variables 1412.

FIG. 14B depicts a system 1420 that includes a client server architecture. One or more user PCs 1422 accesses one or more servers 1424 running a model input space generator 1426 on a processing system 1427 via one or more networks 1428. The one or more servers 1424 may access a computer readable memory 1430 as well as one or more data stores 1432. The one or more data stores 1432 may contain a population of candidate variables 1434 as well as model input variables 1436.

FIG. 14C shows a block diagram of exemplary hardware for a stand alone computer architecture 1450, such as the architecture depicted in FIG. 14A, that may be used to contain and/or implement the program instructions of system embodiments of the present invention. A bus 1452 may serve as the information highway interconnecting the other illustrated components of the hardware. A processing system 1454 labeled CPU (central processing unit) (e.g., one or more computer processors), may perform calculations and logic operations required to execute a program. A processor-readable storage medium, such as read only memory (ROM) 1456 and random access memory (RAM) 1458, may be in communication with the processing system 1454 and may contain one or more programming instructions for performing the method of implementing a model input space generator. Optionally, program instructions may be stored on a computer readable storage medium such as a magnetic disk, optical disk, recordable memory device, flash memory, or other physical storage medium. Computer instructions may also be communicated via a communications signal, or a modulated carrier wave.

A disk controller 1460 interfaces one or more optional disk drives to the system bus 1452. These disk drives may be external or internal floppy disk drives such as 1462, external or internal CD-ROM, CD-R, CD-RW or DVD drives such as 1464, or external or internal hard drives 1466. As indicated previously, these various disk drives and disk controllers are optional devices.

Each of the element managers, real-time data buffer, conveyors, file input processor, database index shared access memory loader, reference data buffer and data managers may include a software application stored in one or more of the disk drives connected to the disk controller 1460, the ROM 1456 and/or the RAM 1458. Preferably, the processor 1454 may access each component as required.

A display interface 1468 may permit information from the bus 1456 to be displayed on a display 1470 in audio, graphic, or alphanumeric format. Communication with external devices may optionally occur using various communication ports 1472.

In addition to the standard computer-type components, the hardware may also include data input devices, such as a keyboard 1472, or other input device 1474, such as a microphone, remote control, pointer, mouse and/or joystick.

This written description uses examples to disclose the invention, including the best mode, and also to enable a person skilled in the art to make and use the invention. The patentable scope of the invention may include other examples. For example, the systems and methods may include data signals conveyed via networks (e.g., local area network, wide area network, interne, combinations thereof, etc.), fiber optic medium, carrier waves, wireless networks, etc. for communication with one or more data processing devices. The data signals can carry any or all of the data disclosed herein that is provided to or from a device.

Additionally, the methods and systems described herein may be implemented on many different types of processing devices by program code comprising program instructions that are executable by the device processing subsystem. The software program instructions may include source code, object code, machine code, or any other stored data that is operable to cause a processing system to perform the methods and operations described herein. Other implementations may also be used, however, such as firmware or even appropriately designed hardware configured to carry out the methods and systems described herein.

The systems' and methods' data (e.g., associations, mappings, data input, data output, intermediate data results, final data results, etc.) may be stored and implemented in one or more different types of computer-implemented data stores, such as different types of storage devices and programming constructs (e.g., RAM, ROM, Flash memory, flat files, databases, programming data structures, programming variables, IF-THEN (or similar type) statement constructs, etc.). It is noted that data structures describe formats for use in organizing and storing data in databases, programs, memory, or other computer-readable media for use by a computer program.

The computer components, software modules, functions, data stores and data structures described herein may be connected directly or indirectly to each other in order to allow the flow of data needed for their operations. It is also noted that a module or processor includes but is not limited to a unit of code that performs a software operation, and can be implemented for example as a subroutine unit of code, or as a software function unit of code, or as an object (as in an object-oriented paradigm), or as an applet, or in a computer script language, or as another type of computer code. The software components and/or functionality may be located on a single computer or distributed across multiple computers depending upon the situation at hand.

It should be understood that as used in the description herein and throughout the claims that follow, the meaning of "a," "an," and "the" includes plural reference unless the context clearly dictates otherwise. Also, as used in the description herein and throughout the claims that follow, the meaning of "in" includes "in" and "on" unless the context clearly dictates otherwise. Finally, as used in the description herein and throughout the claims that follow, the meanings of "and" and "or" include both the conjunctive and disjunctive and may be used interchangeably unless the context expressly dictates otherwise; the phrase "exclusive or" may be used to indicate situation where only the disjunctive meaning may apply.

It is claimed:

1. A computer-implemented method, comprising:
   accessing data on a computing device, wherein the data includes a set of candidate variables and observations corresponding to the candidate variables of the set;
   calculating predictiveness of each of the candidate variables;
   ranking the candidate variables according to the predictiveness calculated for each of the candidate variables;
   determining a set of selected variables and a set of rejected variables, wherein the set of selected variables and the set of rejected variables are both subsets of the set of candidate variables, and wherein determining the set of selected variables includes identifying candidate variables that have more predictive power than the candidate variables in the set of rejected variables;
   generating an initial predictive model using the set of selected variables;
   generating a set of derived variables, wherein generating a set of derived variables includes deriving variables by applying a dimension reduction to the set of rejected variables, wherein a dimension reduction includes projecting a multi-dimensional variable space onto a variable space that is a lower-dimensional variable space than the multi-dimensional variable space;

determining a set of best derived variables, wherein the set of best derived variables is a subset of the set of derived variables, and wherein determining the set of best derived variables includes selecting derived variables that have more predictive power than unselected derived variables;

generating a merged set of variables by combining the set of selected variables with the set of best derived variables, wherein the merged set includes a new input space;

generating a new predictive model using the variables in the merged set;

comparing the new predictive model and the initial predictive model, wherein comparing includes determining which of the compared models achieves a better predictive performance; and performing data analyses using the predictive model that achieves the better predictive performance.

2. The method of claim 1, wherein generating the initial predictive model includes individually quantifying a predictive power of each of the selected variables.

3. The method of claim 1, wherein applying a dimension reduction includes applying a unique dimension reduction for each of the derived variables.

4. The method of claim 1, wherein projecting a multi-dimensional variable space onto a lower-dimensional variable space includes randomly projecting the multi-dimensional space onto the lower-dimensional space, and wherein randomly projecting includes projecting using randomly determined variable coefficients, wherein the multi-dimensional variable space includes a high-dimension variable space.

5. The method of claim 1, wherein deriving variables includes quantifying, for each of the derived variables individually, a predictive power of the derived variable.

6. The method of claim 5, wherein quantifying the predictive power includes performing a regression analysis or calculating at least one of an eigenvalue magnitude, an R-square value, or a Chi-square value.

7. The method of claim 1, wherein ranking the candidate variables includes using a stepwise regression, a correlation calculation or a chi-square test.

8. The method of claim 1, wherein projecting a multi-dimensional variable space onto a lower-dimensional variable space includes using a principal component analysis, a singular value decomposition or a random projection.

9. The method of claim 1, wherein determining a set of best derived variables includes:

calculating an R-square, or a chi-square value for each of the derived variables; and selecting the derived variables that have more predictive power than the other derived variables for the set of best derived variables, wherein selecting the derived variables includes:

identifying derived variables for which the calculated R-square or chi-square value is less than a threshold;

excluding the identified derived variables from the set of best derived variables;

choosing a threshold in order to reduce the dimension of rejected variables, wherein the dimension of the set of best derived variables is less than the dimension of rejected variables.

10. The method of claim 1, wherein generating a merged set of variables includes:

creating a union of two mutually exclusive variable sets, wherein the two mutually exclusive variable sets include the set of best derived variables and the initially selected variables; and creating a new combined input variable space from the merged set of variables.

11. The method of claim 1, wherein generating a new predictive model includes a predictive model that is based on the new combined input variable space.

12. The method of claim 11, wherein comparing the new predictive model and the initial predictive model includes:

conducting a predictive model comparison of two models, wherein a first model is based on the set of initially selected variables on an initial input variable space and the second model is based on the merged variables on the new combined input variable space; and determining whether added derived variables that make the new input space improves model performance.

13. The method of claim 1, wherein performing data analyses using the better model includes determining whether the new input variable space will replace an initial input variable space for further data analyses.

14. A system, comprising:

one or more processors;

one or more non-transitory computer-readable storage mediums containing instructions configured to cause the one or more processors to perform operations including:

accessing data on a computing device, wherein the data includes a set of candidate variables and observations corresponding to the candidate variables of the set;

calculating predictiveness of each of the candidate variables;

ranking the candidate variables according to the predictiveness calculated for each of the candidate variables;

determining a set of selected variables and a set of rejected variables, wherein the set of selected variables and the set of rejected variables are both subsets of the set of candidate variables, and wherein determining the set of selected variables includes identifying candidate variables that have more predictive power than the candidate variables in the set of rejected variables;

generating an initial predictive model using the set of selected variables;

generating a set of derived variables, wherein generating a set of derived variables includes deriving variables by applying a dimension reduction to the set of rejected variables, wherein a dimension reduction includes projecting a multi-dimensional variable space onto a variable space that is a lower-dimensional variable space than the multi-dimensional variable space;

determining a set of best derived variables, wherein the set of best derived variables is a subset of the set of derived variables, and wherein determining the set of best derived variables includes selecting derived variables that have more predictive power than unselected derived variables;

generating a merged set of variables by combining the set of selected variables with the set of best derived variables, wherein the merged set includes a new input space;

generating a new predictive model using the variables in the merged set;

comparing the new predictive model and the initial predictive model, wherein comparing includes determining which of the compared models achieves a better predictive performance; and performing data analyses using the predictive model that achieves the better predictive performance.

15. The system of claim 14, wherein generating the initial predictive model includes individually quantifying a predictive power of each of the selected variables.

16. The system of claim 14, wherein applying a dimension reduction includes applying a unique dimension reduction for each of the derived variables.

17. The system of claim 14, wherein projecting a multi-dimensional variable space onto a lower-dimensional variable space includes randomly projecting the multi-dimensional space onto the lower-dimensional space, and wherein randomly projecting includes projecting using randomly determined variable coefficients, wherein the multi-dimensional variable space includes a high-dimension variable space.

18. The system of claim 14, wherein deriving variables includes quantifying, for each of the derived variables individually, a predictive power of the derived variable.

19. The system of claim 18, wherein quantifying the predictive power includes performing a regression analysis or calculating at least one of an eigenvalue magnitude, an R-square value, or a Chi-square value.

20. The system of claim 14, wherein ranking the candidate variables includes using a stepwise regression, a correlation calculation or a chi-square test.

21. The system of claim 14, wherein projecting a multi-dimensional variable space onto a lower-dimensional variable space includes using a principal component analysis, a singular value decomposition or a random projection.

22. The system of claim 14, wherein determining a set of best derived variables includes:
   calculating an R-square, or a chi-square value for each of the derived variables; and
   selecting the derived variables that have more predictive power than the other derived variables for the set of best derived variables, wherein selecting the derived variables includes:
      identifying derived variables for which the calculated R-square or chi-square value is less than a threshold;
      excluding the identified derived variables from the set of best derived variables;
      choosing a threshold in order to reduce the dimension of rejected variables, wherein the dimension of the set of best derived variables is less than the dimension of rejected variables.

23. The system of claim 14, wherein generating a merged set of variables includes:
   creating a union of two mutually exclusive variable sets, wherein the two mutually exclusive variable sets include the set of best derived variables and the initially selected variables; and
   creating a new combined input variable space from the merged set of variables.

24. The system of claim 14, wherein generating a new predictive model includes a predictive model that is based on the new combined input variable space.

25. The system of claim 24, wherein comparing the new predictive model and the initial predictive model includes:
   conducting a predictive model comparison of two models, wherein a first model is based on the set of initially selected variables on an initial input variable space and the second model is based on the merged variables on the new combined input variable space; and
   determining whether added derived variables that make the new input space improves model performance.

26. The system of claim 14, wherein performing data analyses using the better model includes determining whether the new input variable space will replace an initial input variable space for further data analyses.

27. A computer-program product, tangibly embodied in a machine-readable non-transitory storage medium, including instructions configured to cause a data processing apparatus to perform operations including:
   accessing data on a computing device, wherein the data includes a set of candidate variables and observations corresponding to the candidate variables of the set;
   calculating predictiveness of each of the candidate variables;
   ranking the candidate variables according to the predictiveness calculated for each of the candidate variables;
   determining a set of selected variables and a set of rejected variables, wherein the set of selected variables and the set of rejected variables are both subsets of the set of candidate variables, and wherein determining the set of selected variables includes identifying candidate variables that have more predictive power than the candidate variables in the set of rejected variables;
   generating an initial predictive model using the set of selected variables;
   generating a set of derived variables, wherein generating a set of derived variables includes deriving variables by applying a dimension reduction to the set of rejected variables, wherein a dimension reduction includes projecting a multi-dimensional variable space onto a variable space that is a lower-dimensional variable space than the multi-dimensional variable space;
   determining a set of best derived variables, wherein the set of best derived variables is a subset of the set of derived variables, and wherein determining the set of best derived variables includes selecting derived variables that have more predictive power than unselected derived variables;
   generating a merged set of variables by combining the set of selected variables with the set of best derived variables, wherein the merged set includes a new input space;
   generating a new predictive model using the variables in the merged set;
   comparing the new predictive model and the initial predictive model, wherein comparing includes determining which of the compared models achieves a better predictive performance; and
   performing data analyses using the predictive model that achieves the better predictive performance.

28. The computer-program product of claim 27, wherein generating the initial predictive model includes individually quantifying a predictive power of each of the selected variables.

29. The computer-program product of claim 27, wherein applying a dimension reduction includes applying a unique dimension reduction for each of the derived variables.

30. The computer-program product of claim 27, wherein projecting a multi-dimensional variable space onto a lower-dimensional variable space includes randomly projecting the multi-dimensional space onto the lower-dimensional space, and wherein randomly projecting includes projecting using randomly determined variable coefficients, wherein the multi-dimensional variable space includes a high-dimension variable space.

31. The computer-program product of claim 27, wherein deriving variables includes quantifying, for each of the derived variables individually, a predictive power of the derived variable.

32. The computer-program product of claim 31, wherein quantifying the predictive power includes performing a regression analysis or calculating at least one of an eigenvalue magnitude, an R-square value, or a Chi-square value.

33. The computer-program product of claim 27, wherein ranking the candidate variables includes using a stepwise regression, a correlation calculation or a chi-square test.

34. The computer-program product of claim 27, wherein projecting a multi-dimensional variable space onto a lower-dimensional variable space includes using a principal component analysis, a singular value decomposition or a random projection.

35. The computer-program product of claim 27, wherein determining a set of best derived variables includes:
- calculating an R-square, or a chi-square value for each of the derived variables; and
- selecting the derived variables that have more predictive power than the other derived variables for the set of best derived variables, wherein selecting the derived variables includes:
  - identifying derived variables for which the calculated R-square or chi-square value is less than a threshold;
  - excluding the identified derived variables from the set of best derived variables;
  - choosing a threshold in order to reduce the dimension of rejected variables, wherein the dimension of the set of best derived variables is less than the dimension of rejected variables.

36. The computer-program product of claim 27, wherein generating a merged set of variables includes:
- creating a union of two mutually exclusive variable sets, wherein the two mutually exclusive variable sets include the set of best derived variables and the initially selected variables; and
- creating a new combined input variable space from the merged set of variables.

37. The computer-program product of claim 27, wherein generating a new predictive model includes a predictive model that is based on the new combined input variable space.

38. The computer-program product of claim 37, wherein comparing the new predictive model and the initial predictive model includes:
- conducting a predictive model comparison of two models, wherein a first model is based on the set of initially selected variables on an initial input variable space and the second model is based on the merged variables on the new combined input variable space; and
- determining whether added derived variables that make the new input space improves model performance.

39. The computer-program product of claim 27, wherein performing data analyses using the better model includes determining whether the new input variable space will replace an initial input variable space for further data analyses.

* * * * *

UNITED STATES PATENT AND TRADEMARK OFFICE
CERTIFICATE OF CORRECTION

| | | |
|---|---|---|
| PATENT NO. | : 8,775,338 B2 | Page 1 of 1 |
| APPLICATION NO. | : 12/647064 | |
| DATED | : July 8, 2014 | |
| INVENTOR(S) | : Lee | |

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 618 days.

Signed and Sealed this
First Day of September, 2015

Michelle K. Lee
*Director of the United States Patent and Trademark Office*